United States Patent [19]

Mukaemachi et al.

[11] 4,041,246
[45] Aug. 9, 1977

[54] THYRISTOR CROSS-POINT SWITCH WITH CONTROL

[75] Inventors: Takuzi Mukaemachi; Toshiaki Toyama, both of Yokohama; Taturu Miyoshi, Fujisawa, all of Japan

[73] Assignee: Hitachi, Ltd., Japan

[21] Appl. No.: 595,497

[22] Filed: July 14, 1975

[30] Foreign Application Priority Data

July 17, 1974    Japan ................................ 49-81100

[51] Int. Cl.² ............................................. H04Q 3/52
[52] U.S. Cl. ........................................ 179/18 GF
[58] Field of Search ................. 179/18 GF, 2 TS;
340/166 R; 307/252 K, 252 L

[56] References Cited

U.S. PATENT DOCUMENTS

| | | | |
|---|---|---|---|
| 3,531,773 | 9/1970 | Beebe | 179/18 GF |
| 3,655,919 | 4/1972 | Laane | 179/18 GF |
| 3,720,792 | 3/1973 | Resta | 179/18 GF |
| 3,881,066 | 4/1975 | Macrander et al. | 179/18 GF |

Primary Examiner—George G. Stellar
Attorney, Agent, or Firm—Craig & Antonelli

[57] ABSTRACT

A transmission system comprising a network including cross-point switches arranged by four-layer semiconductor switching elements having self-holding function; an input connection circuit connected to the high potential side of a link of the network to supply the four-layer semiconductor switching elements with dc bias current for self-holding and including means to restrict the upper limit of the dc bias current and modulating means for superposing a signal to be transmitted on the dc bias current; a current control circuit connected to the low potential side of the link of the network and including a current switch circuit and an absorption type constant current circuit connected in parallel through a diode to the current switch circuit, both the circuits being so disposed as to permit the dc bias current from the high potential to the lower potential side of the link, and an output connection circuit, wherein, when the link of the network is to be closed, the current switch and the absorption type constant current circuit are activated thereby causing the four-layer semiconductor switching elements to be rendered conductive and then the current switch is rendered non-conductive, while the absorption type constant current circuit is rendered simultaneously to absorb the dc bias current.

1 Claim, 5 Drawing Figures

THYRISTOR CROSS-POINT SWITCH WITH CONTROL

BACKGROUND OF THE INVENTION

1. FIELD OF THE INVENTION

The invention relates to a unidirectional space division transmission system employing four-layer semiconductor switching elements (for example, PNPN transistors or PNPN diodes) for a cross-point switch.

2. DESCRIPTION OF THE PRIOR ART

As well known, a four-wire channel is generally used in the transmission system for video signal exchange in video phones in order to facilitate insertion of repeater amplifiers in the transmission system. Thus, the four-wire channel transmission system may be considered in construction as a combination of two systems each having unidirectional two-wire channel. This will be described in more detail with reference to FIG. 1.

In FIG. 1 illustrating in block form such a transmission system for video signal exchange, SUB A and SUB B designate video telephone sets, $NW_1$ and $NW_2$ networks for video signal exchange, CTL a control unit for controlling the networks $NW_1$ and $NW_2$, 1, 2, 9, and 10 subscriber lines, 3, 4, 7, 8, 11, and 12 links, and 5 and 6 junctors. Control for connection between calling and called subscribers is carried out by a voice signal exchange system not shown. The video signal derived from the video telephone set SUB A is transmitted to the video telephone set SUB B through the channel of subscriber line 1 — link 3— junctor 5— link 7— subscriber line 9, while the video signal derived from the video telephone set SUB B is transmitted to the video telephone set SUB A through the channel of subscriber line 2— link 4— junctor 6— link 8— subscriber line 10. From the just-mentioned construction of the channels, it will be seen that the signals pass always in the same direction through the network $NW_1$ or the network $NW_2$, and that a pair of two-wire channels are independently established through up links 3 and 7 and down links 4 and 8.

In FIG. 2 is shown a conventional transmission system in which each of the channels in FIG. 1 is comprised of four-layer semiconductor switching elements. In this instance, PNPN transistors (hereinafter referred simply to as thyristor) are employed as the four-layer semiconductor switching elements. In the figure, NW designates a network comprising thyristors, IB and input connection circuit located for connection between the subscriber line and the network NW, OB an output connection circuit located for connection between the network NW and another subscriber line, CS a current control circuit for controlling the dc bias current so as to hold the thyristors conductive and CTL is a control unit.

More particularly, in FIG. 2, +VH designates a power source for the dc bias current, +VB another power source for a bias supply, 1 to 4 thyristors which cooperatively form a cross-point switch means generally designated by 50, 5 to 8 resistances each for setting a cathode potential of each of the thyristors when they are non-conductive, 9 a current restricting resistance, 10 and 11 choke coils, 12 an input transformer 13 and 14 capacitances for blocking dc current flow. Means generally designates by 52 is provided for control the dc bias current and includes constant current circuits 15 and 16, a diode 17 for preventing a reverse-bias application, and memory devices 18 and 19 for controlling the constant current 15 and 16. The output connection circuit OB includes an output transformer 20, capacitances 21 and 22 for blocking dc current flow, an output transformer 20, and an amplifier 23 to compensate for the insertion loss due to the use of the thyristors 1 to 4, the input transformer 12, the capacitances 13, 14, 21 and 22; the choke coils 10 and 11, and the output transformer 20. Switch means 51 and control means 53 which are similar to the switch means 50 and control means 52 as above-mentioned, constitute another route parallel to the route including the means 50 and 52.

The operation of the transmission system in FIG. 2 will be described below. A voice signal control unit (not shown) first issues a commond requesting a formation of a channel for video signal. In response to the command, the control unit CTL acts to select the corresponding input and output connection circuits IB and OB, and deliver necessary control signals to the thyristors in the network NW and to the current control circuit CS. Thereby to establish a channel for the video signal as requested. More precisely, the control unit CTL delivers a control signal for activiating the memory devices 18 and 19 associated with the corresponding constant current circuits 15 and 16. Upon receipt of the control signal, the memory devices are set to drive the associated constant current circuits 15 and 16. Following this, the control unit CTL applies gate pulses to the gates of the thyristors 1 to 4 so as to fire these thyristors in the order of the one closest to the circuit CS, next closer one and so on, i.e. 4, 3, 2 and 1. When the thyristor 1 is fired, the dc bias current flows through two routes of power source +VH — resistance 9 — choke coil 10 — thyristors 1, 2, 3 and 4 — constant current circuit 15 — ground, and +VH — resistance 9 — choke coil 10 — thyristors 1, 2, 3 and 4 — diode 17 — constant current circuit 16 — ground. The dc bias current is determined in value by the constant current circuits 15 and 16. Similarly, the route of power source +VH — resistance 9 — choke coil 11 — switch means 51 — control means 53 — ground serves to supply the switch means 51 with a DC bias current. If the dc bias current is above the holding current of the thyristors 1 to 4, these thyristors 1 to 4 remains conductive even after the gate pulse is removed. In this manner, a channel is completed through ac coupling between the inputs $a_1$ and $b_1$ and the outputs $a_2$ and $b_2$. The channel is interrupted by resetting the memory devices 18 and 19. That is, the reset of the memory devices 18 and 19 causes the constant current circuits 15 and 16 to be interrupted. As a result, the dc bias current reduces to zero and thus thyristors 1 to 4 turn off by themselves.

An explanation will be given about the operation of the diode 17 for preventing a reverse bias application. Assume now that the constant current circuit 15 and the diode 17 are eliminated from the circuit of FIG. 2. If the thyristors of the switching means 51 are fired before firing of the thyristors 1 to 4, a current flows through the route of power source +VH — resistance 9 — choke coil 11 — switch means 51 — control means 53 — ground. This current flow causes the voltage level at the junction between the control means 53 and the capacitance 22, and thereby the terminal voltage V of the constant current to rise. The rise of the terminal voltage also would increase the cathode potential of the thyristor 4 which in turn would block the gate current flow from the gate thereby to prevent the thyristors 1 to 4 from being fired. For avoiding such firing trouble of the thyristors, an arrangement is needed in which the diode 17 is provided between the constant current circuits 15 and 16. The control of the channel in such a manner by using thyristors is well known. Incidentally, it might be considered that inductances of the coils used in the input and output transformers 12 and 20 could be utilized for arranging the dc bias current supply circuit mentioned above. But, practically the choke coils 10 and 11 and the constant current circuits 15 and 16 are additionally connected for the purpose. This is because it is hard to obtain a transformer which is applicable to a broad range of frequencies with dc bias superposed thereon, from an economical standpoint.

The conventional transmission system so far described uses transformers and capacitors in the input and output circuits, resulting in the following especially, when it is used for a transmission of video signals in a broad frequency band from several tens of Hz to several MHz.

That is, the input transformer 12, the output transformer 20, the choke coils 10 and 11 must be large in size because it is required to pass signals of low frequencies of several tens of Hz without distortion. This prevents the practical application of the conventional transmission system on fitting and economical grounds.

Further, the frequency characteristic of the transmission loss in the channel is hardly improved because of the use of the input transformer 12 and the output transformer 20. For this, both of the transmission loss and variation of the loss are large either in low frequency range below 100 Hz or in high frequency range above several hundreds of KHz. Accordingly, the conventional transmission system could not achieve satisfactory performance, such as satisfying the quality standard in transmission.

Moreover, two constant current circuits are needed for the current control circuit CS so that the system becomes large in size, and additionally the constant current circuit necessitates some means to radiate heat, and thus the system becomes expensive.

Further disadvantages are that if the current path including the thyristors 1 to 4, and the current control control circuit CS is erroneously short-circuited to the ground during a test of adjustment, an earth current flows through a path of, for example, power source +VH —resistance 9 — choke coil 10 — thyristor 1 to the ground. The earth current is restricted somehow by the resistance 9 and the choke coil 10. However, it is difficult to reduce the earth current below the current capacity of the thyristor when considering the voltage withstand and the current capacity of the thyristor, and the value of dc bias current. Therefore, whenever the earth current flows, the thyristor is generally damaged.

SUMMARY OF THE INVENTION

Accordingly, an object of the present invention is to provide a high performance transmission system comprising cross-point switches formed by four-layer semiconductor switching elements, and being small in size and light in weight.

Another object of the present invention is to provide a transmission system having a transmission characteristic which is substantially flat over the frequency range from several tens of Hz to several MHz.

Still another object of the present invention is to provide a transmission system which is not damaged even when the thyristors or current control circuit is erroneously grounded during a test or adjustment.

According to the present invention, these objects are achieved by a transmission system comprising: a network including cross-point switches formed by four-layer semiconductor switching elements having self-holding function; an input connection circuit disposed at the high potential side of the link of said network to supply the four-layer semiconductor switching elements with dc bias current to hold them conductive and including means to restrict the upper limit of the dc bias current and modulating means for superposing the signal to be transmitted on the dc bias current; a current control circuit disposed at the low potential side of the link of the network including a first constant current circuit and a second constant current circuit connected in parallel through a diode to the first constant current circuit, both the constant current circuits being so disposed as to permit the dc bias current to flow from the high potential side to the low potential side of the link; and an output connection circuit; wherein the first and second constant current circuits are activated when the link of the network is to be closed.

The above and other objects, features and advantages of the invention will be apparant from the detailed description taken in conjunction with the accompanying drawings.

DESCRIPTION OF THE PREFERRED EMBODIMENT

Figure 3:
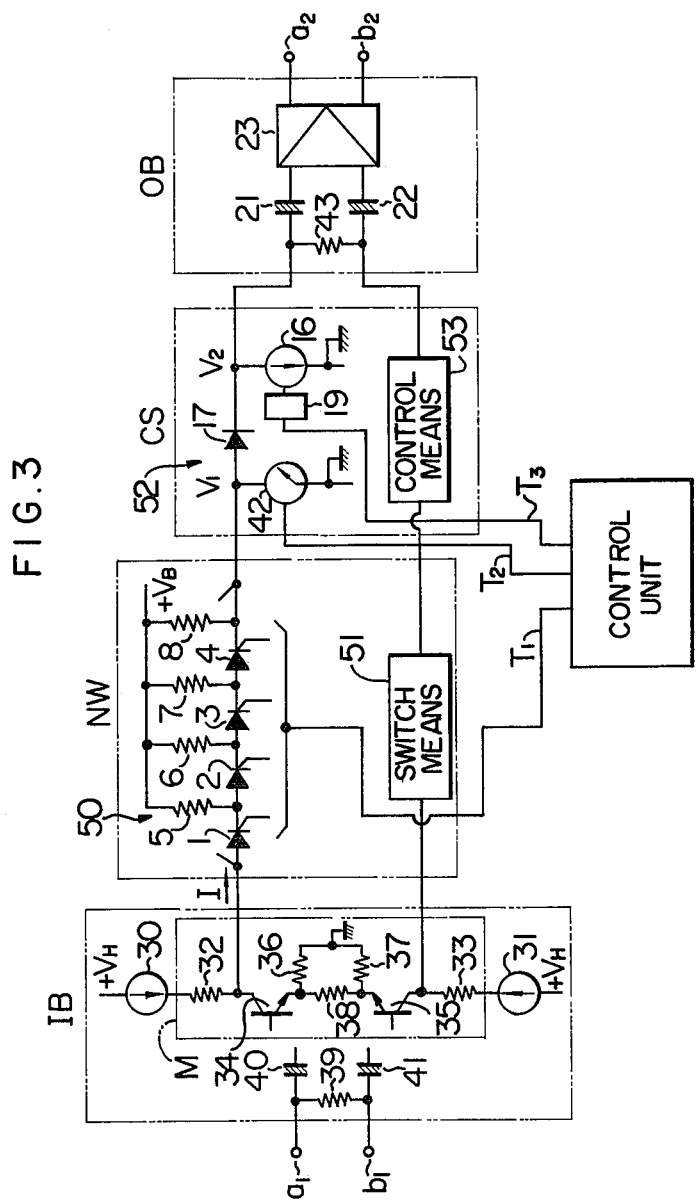
FIG. 3 is a schematic circuit diagram of a transmission system according to this invention.

Referring now to FIG. 3, there is shown a unidirectional space division transmission system employing four-layer semiconductor switching elements for cross-point switches according to this invention. In the figure, NW designates a network comprising thyristors, IB an input connection circuit located for connection between the network NW and the subscriber line, OB an output connection circuit located for connection between the network NW and another subscriber line, CS a current control circuit for controlling a dc bias current to hold the thyristors conductive, and CTL a control unit.

Figure 1:
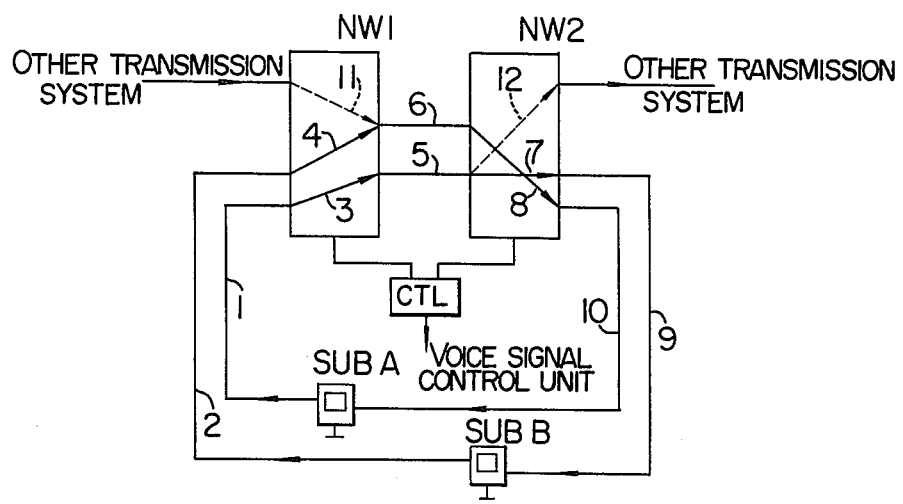
FIG. 1 illustrates in block form a transmission system for video signal exchange.
Figure 2:
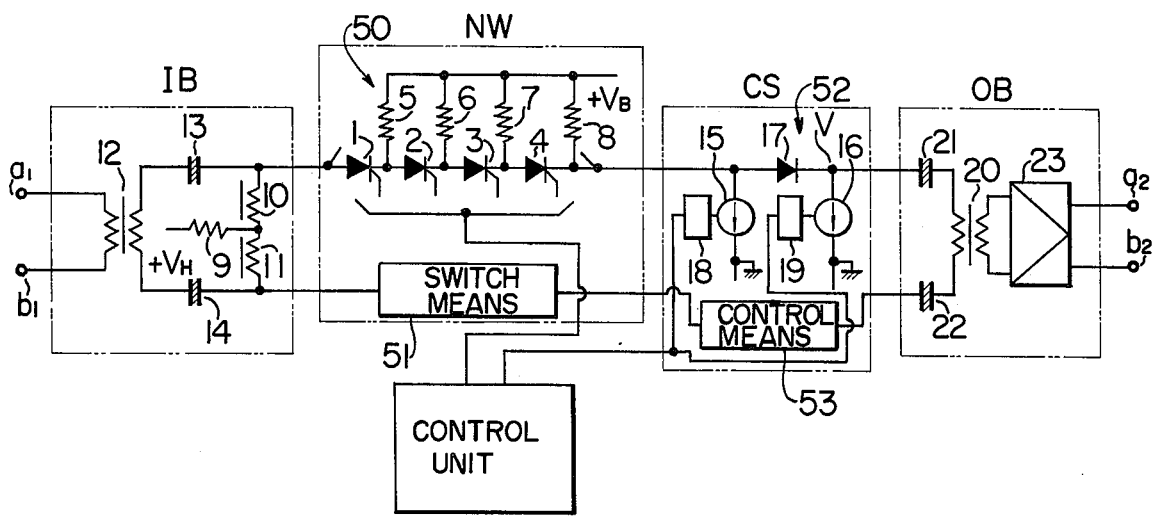
FIG. 2 is a schematic circuit diagram of a prior art transmission system.

More precisely, in FIG. 2, +VH designates a power source for supplying the, thyristors with dc bias current, +VB another power source for supplying the thyristors with a bias voltage, 1 to 4 thyristors which cooperatively forms a cross-point switch, 5 to 8 resistances for setting a cathode potential of the thyristors 1 to 4 when they are in off condition, 16 an absorption type constant current circuit, 19 a memory device for controlling the constant current circuit, 17 a diode for preventing a reverse-bias application, 21 and 22 capacitors for blocking dc current flow, and 23 an amplifier. In FIG. 3, like symbols are used to designate like parts or portions in FIG. 2. In the input connection circuit IB shown in FIG. 3, a modulation circuit M acts to superpose a video signal applied to input terminals $a_1$ and $b_1$ on the dc bias current, and is comprised of resistances 32, 33, 36 to 38, and transistors 34 and 35. In the circuit IB, 30 and 31 are current restriction circuits, 39 a terminating resistance, and 40 and 41 capacitors for blocking dc current flow. Incidentally, a suitable amplifier, if necessary, may be connected between the capacitors 40 and 41 and the bases of the transistors 34 and 35. In the current control circuit CS, a current switch 42 is used in place of the constant current circuit employed in the conventional transmission system. In the output connection circuit OB is used a terminating resistance 43 in place of the output transformer employed in the conventional transmission system.

Figure 4:
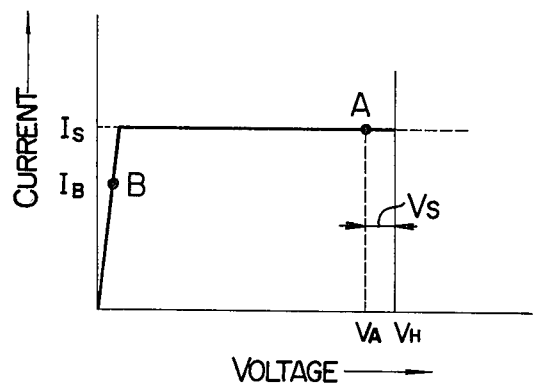
FIG. 4 is a graph illustrating the voltage vs. current characteristic of the current restriction circuit shown in FIG. 3.

The operation of the system shown in FIG. 3 will now be described. The control unit CTL first delivers control signals $T_2$ and $T_3$ to actuate the current switch 42 and the absorption type constant current circuit 16 of a selected current control circuit CS, and then applies a gate pulse voltage $T_1$ to the thyristors 1 to 4. The terminal voltage $V_2$ of the absorption type constant control circuit is sustained at several volts of the saturation voltage $V_o$ even when its absorption current is zero, while the terminal voltage $V_1$ of the current switch 42 is at low voltage, such as 0.2 V to 0.5 V, of the saturation voltage between the collector and emitter of the transistor. For this, the gate current flows through the route of gates of the thyristors — cathodes of the thyristors — current switch 42 — ground, thereby to fire the thyristors. Note that no current flows through the absorption type constant current circuit 16. When all of the thyristors 1 to 4 are fired, the dc bias current flows the route of power source +VH — current restriction circuit 30 — resistance 32 — thyristors 1 to 4 — current switch 42 — ground, thereby to hold the thyristors 1 to 4 conductive. The value of the dc bias current is determined by the resistance 32 and the current restriction circuit 30. The resistance 32 is very small, for example, about 50 Ω to 100 Ω because it is also used as a terminating resistance and therefore it must be matched with the characteristic impedance of link wiring. The current restriction circuit 30 may be a constant current circuit 30 having the voltage vs. current characteristic as shown in FIG. 4, i.e. a set current of $I_s$.

Figure 5:
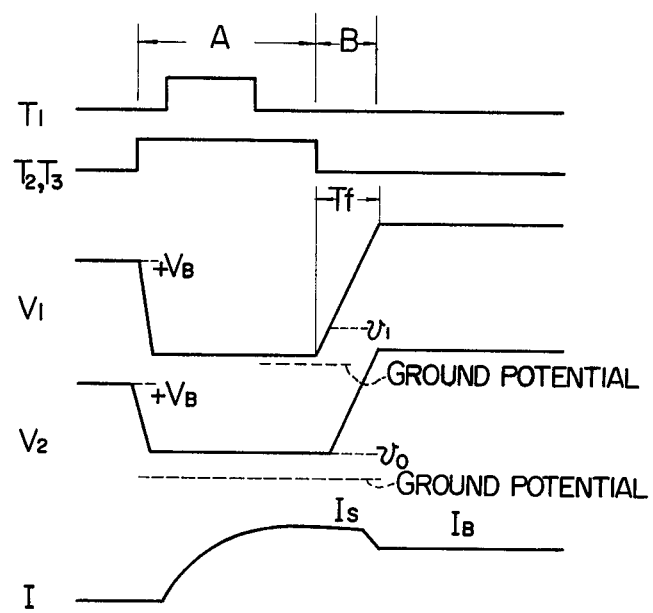
FIG. 5 show waveforms for illustrating the operation of the circuit shown in FIG. 3.

Accordingly, the dc bias current is restricted in its upper limit by the current restriction circuit 30 to its set current $I_s$ (about 40 to 60 mA). That is, the dc bias current is prevented by the current restriction circuit 30 from exceeding the upper limit. The operating point of the current restriction circuit 30 lies on a point A shown in FIG. 4. The point A corresponds to the voltage $V_A$ which is obtained by subtracting the sum $V_S$ of the voltage drops developed across the resistance 32, the thyristors 1 to 4, and the current switch 42 from the source voltage $V_H$. The operation so far described is done in the region A shown in FIG. 5.

Then, the control signal $T_2$ transferred to the current switch 42 is ceased and the current switch 42 is rendered non-conductive, the gradually in accordance with a suitable time constant Tf so that the terminal voltage $V_1$ of the current switch 42 increases gradually and after the terminal voltage $V_1$ reaches the sum $V_1$ of the forward voltage drop across the diode 17 and the saturation voltage $v_o$ of the absorption type constant current circuit 16, the dc bias current is transferred gradually to the absorption type constant current circuit 16. When the current switch 42 is completely turned off and thereby the dc bias current is fully transferred to the absorption type constant current circuit 16, the bias current reaches another set current $I_B$ (about 20 to 30 mA) of the absorption type constant current circuit 16. At this time, the operating point of the current restriction circuit 30 shifts to a point B in FIG. 4, since $I_S > I_B$. Accordingly, the output impedance of the current restriction circuit at this time is sufficiently small in practical use. The operation just mentioned relates to the region B in FIG. 5.

As a result of the above-mentioned operation, the route of power source +VH — current restriction circuit 30 — resistance 32 — thyristors 1 to 4 — reverse bias preventing diode 17 — absorption type constant current circuit 16 — ground is established to pass the dc bias current of $I_B$ therethrough.

The function of the reverse bias preventing diode 17 will be given below. Assume now that the current switch 42 and the diode 17 are eliminated from the circuit of FIG. 3. When the thyristors of the switch means 51 are fired just before firing of the thyristors 1 to 4, the current flowing through the power source +VH — current restriction circuit 31 — resistance 33 — the switch means 51 to the control means 53 is partially passed through the absorption type constant current circuit provided in the control means 53 and partially applied through the resistance 43 to the absorption type constant current circuit 16 of the control means 52. For this, the terminal voltage $V_2$ rises. The rise of the terminal voltage would increase of the cathode potential of the thyristor 4 which in turn could block the gate current flow in the thyristors thereby to prevent the thyristors 1 to 4 from being fired. For avoiding such firing trouble of the thyristors, an arrangement is needed in which the diode 17 is provided between the constant current circuits. In FIG. 3 illustrating the circuit diagram of the transmission system according to the present invention, a current switch is employed for the constant current circuit located close to the thyristors constituting the link of the network.

The use of the diode 17 prevents one of the constant current circuits (current switch circuit) closer to the thyristors from being influenced by the operation of thyristors in the other path. Accordingly, a stable operation of the thyristors is ensured. Incidentally, the constant current circuit disposed closer to the output connection circuit OB is used to supply the reverse voltage preventing diode with its switching current.

In the circuit of FIG. 3, it should be noted that an economical current switch 42 is used for firing the thyristors, and after the thyristors are fired, an absorption type constant current circuit 16, is activiated to provide a path of the dc bias current. This arrangement enables the cost reduction of the transmission system. Since the current switch 42 is turned off except for during the start of operation, the insertion loss due to the connection of the switch is negligibly small.

An explanation will be given about an ac (video) signal to be transmitted through the system in this instance. The video signal to be transmitted is applied to the input terminals $a_1 - b_1$, and then activiates the transistors 34 and 35 in the modulation circuit. The video signal is superposed on the dc bias current in the form of a differential signal variation of voltage, through the resistances 32 and 33 when the transistors 34 and 35 are activated. The differential signal of voltage is transferred to the terminating resistance 43, through the thyristors 1 to 4 and the reverse bias preventing diode 17 bias. The differential voltage, developed across the terminating resistance 43 in the output connection circuit OB is amplified by the amplifier 23 for compensating for the loss during the transmission through the network, and supplied to the output terminals $a_2 - b_2$.

As described above, in the transmission system according to this invention, the conventional input and output transformers and choke coils which are usually large in size and costly are eliminated and replaced by electronic components. Further, capacitors are inserted at the input sides of the high impedance modulation circuit and amplifier to block dc component, resulting in great advantages in that the transmission system is made small in size, light in weight, and economical.

Since the input and output transformer and the capacitors of large capacity are eliminated, the transmission system of the invention provide good transmission characteristic having substantially flat frequency characteristic over the frequency range of several tens of Hz to several MHz.

In the system according to this invention, the current restriction circuit provided at the current supply is effective to prevent the thyristors from being damaged, even if the thyristor network or the control circuit is erroneously shortcircuited to the ground due to failure in operation or adjustment, since the short-circuit current through the thyristors is restricted to small value. This effect is very advantageous because it enables an adjustment work at manufacture to be carried out smoothly and safely.

Since the present system uses a positive power source the positive logic components such as TTL or DTL may well be applied to the system. By this, the control of the system may be designed without excess cost.

By using a current switch for one of the two constant current circuits to be used in the current control section of the system, it is possible not only to save the use of memory device, to make the size smaller and to reduce the manufacturing cost, but also to provide smooth and reliable actuation of the thyristors since the current switch is completely grounded. Incidentally, switching between the absorption type constant current circuit and the current switch is automatically performed, so that no additionary circuitry is necessary for such a switch control.

From the foregoing description, it will be understood that this invention provides a space division transmission system employing four-layer semiconductor switching elements as cross-point switches which is small in size, light in weight, and economical, and further has a transmission characteristic much the same as that of a conventional transmission system constructed by mechanical contacts.

While the thyristor with a gate terminal is used as the four-layer semiconductor switching element in the instance heretofore described, it will be easily understood that the four-layer semiconductor switching element of other type, for example, PNPN diodes, may also be employed, although the firing system associated with it is also different.

We claim:

1. A transmission system comprising: a network including cross-point switches formed by four-layer semiconductor switching elements having self-holding function; an input connection circuit disposed at the high potential side of the link of said network to supply said four-layer semiconductor switching elements with dc bias current for holding them conductive and including means to restrict the upper limit of the dc bias current and modulating means for superposing a signal to be transmitted on the dc bias current; a current control circuit disposed at the low potential side of the link of said network and including a current switch circuit and an absorption type constant current circuit, connected in parallel through a diode to said current switch circuit, both circuits being so connected as to permit the dc bias current from the high potential side to the low potential side of said link, an output connection circuit, means for causing said current switch and said absorption type constant current circuit to activate thereby rendering said four-layer semiconductor switching elements conductive when the link of said network is to be closed and means for turning off said current switch so that the dc bias current is transferred to said absorption type constant current circuit.

* * * * *